May 12, 1959          A. WRIGHT          2,885,727
APPARATUS FOR MANUFACTURING CANDLES

Filed March 5, 1956          3 Sheets-Sheet 1

INVENTOR
Arthur Wright
BY
Kenyon & Kenyon
ATTORNEYS

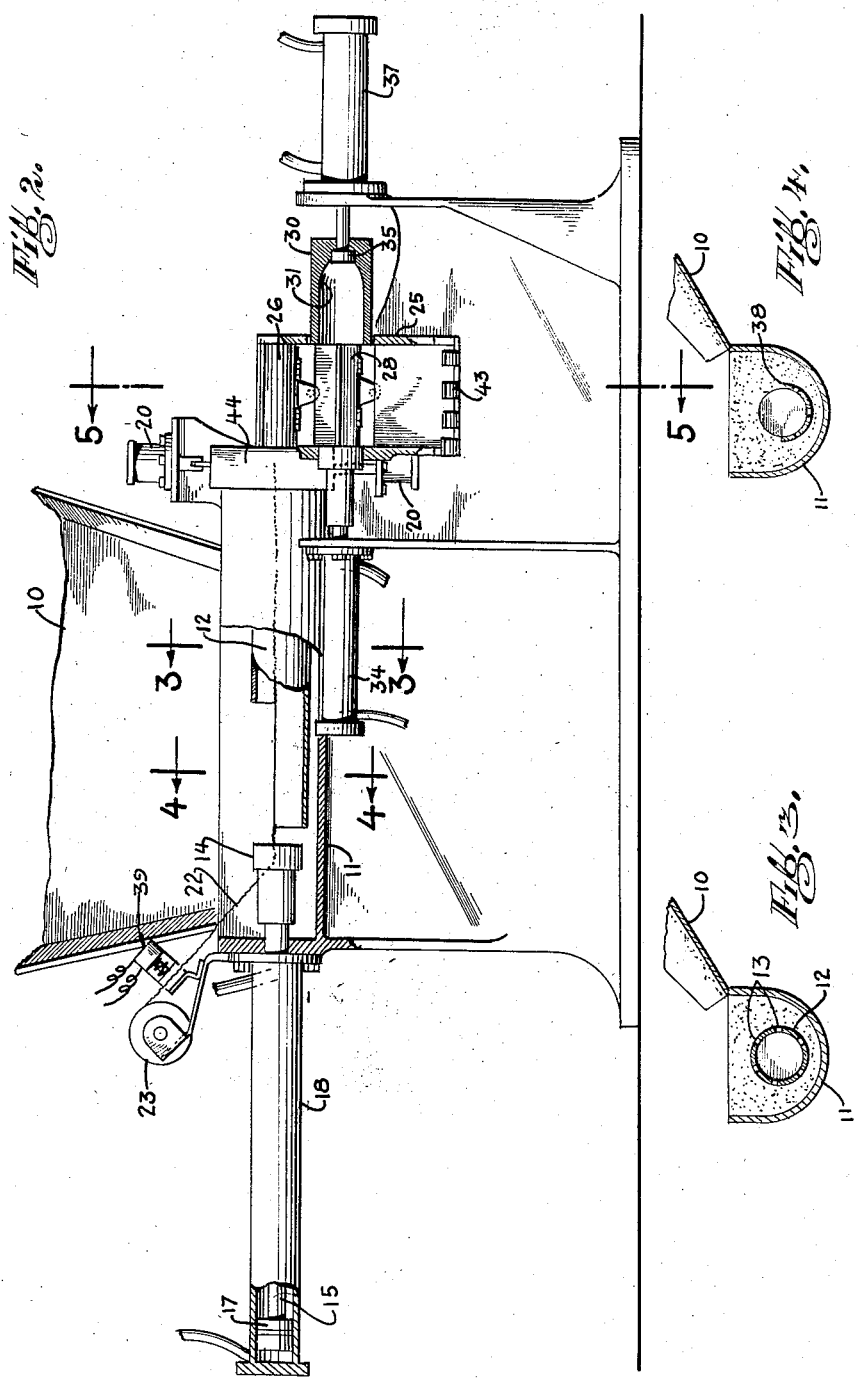

May 12, 1959
A. WRIGHT
2,885,727
APPARATUS FOR MANUFACTURING CANDLES
Filed March 5, 1956
3 Sheets-Sheet 3
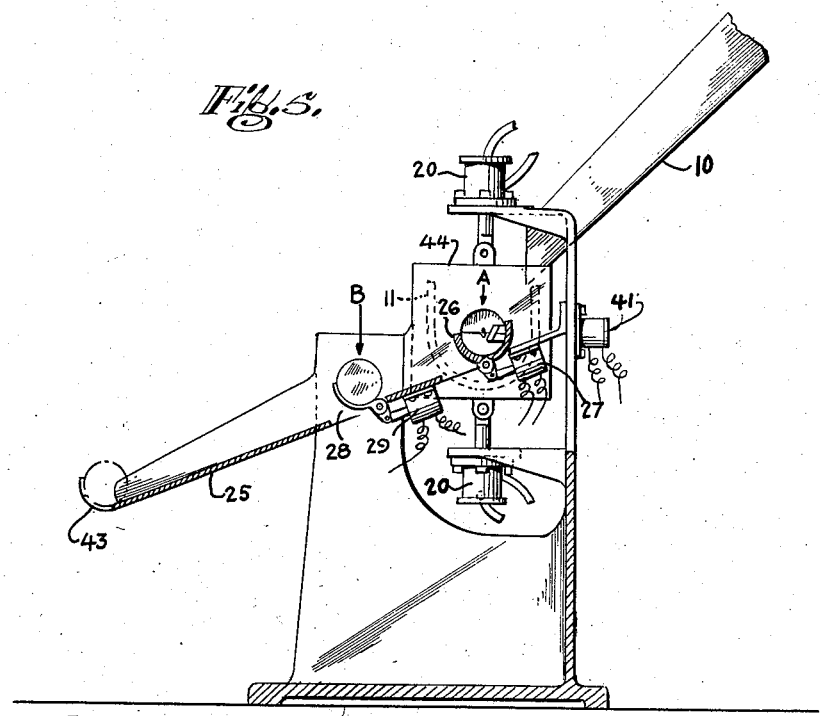
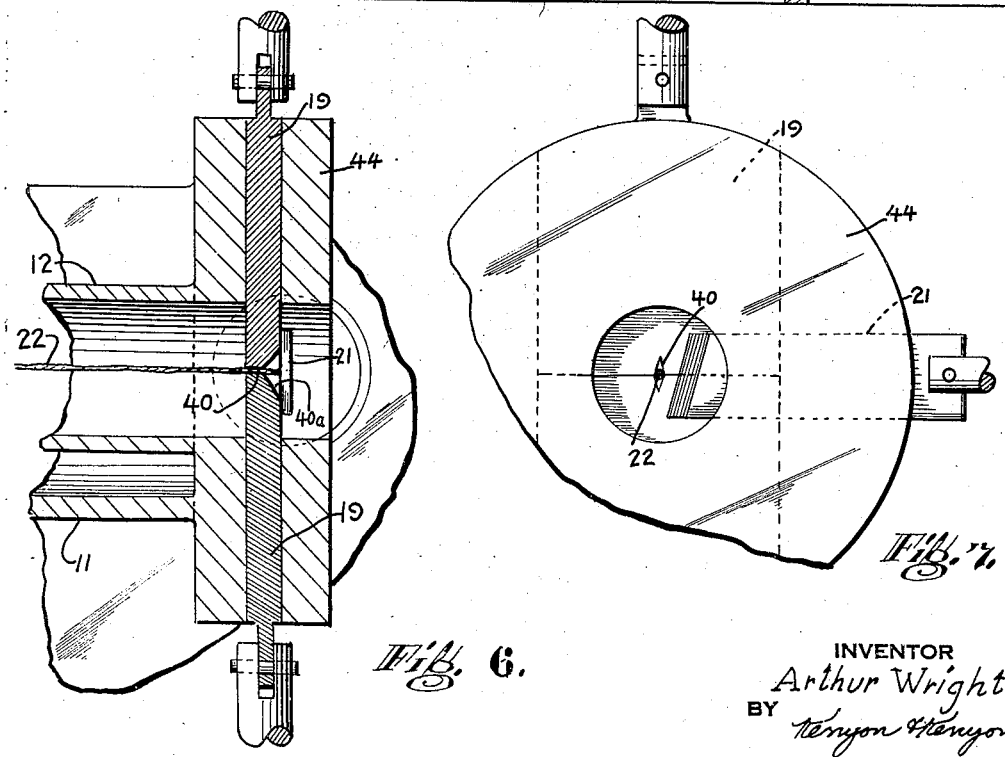
INVENTOR
Arthur Wright
BY
ATTORNEYS

United States Patent Office 2,885,727
Patented May 12, 1959

2,885,727
APPARATUS FOR MANUFACTURING CANDLES

Arthur Wright, Mountain Lakes, N.J.

Application March 5, 1956, Serial No. 569,467

10 Claims. (Cl. 18—1)

The invention relates to apparatus for manufacturing candles.

It is a principal object of this invention to provide apparatus whereby candles may be made rapidly and to accurate predetermined contours by molding a waxy material which is supplied in finely-divided particulate form. It is a particular object of this invention to provide such apparatus whereby candles of relatively large size may be produced such as a one-pound devotional candle about 7¼" in length and about 2¾" in diameter.

Features of this invention relate to apparatus according to which the molding of a candle body from a friable mass of finely divided particulate waxy material is accomplished in two steps. In the first step a rudimentary candle body or slug is formed and a wick may be centrally disposed in the rudimentary candle body. In the second step the rudimentary candle body is formed so as to have its desired predetermined peripheral contours.

Further features of this invention relate to the utilization in the first step of a foraminous mold wherein finely divided wax particles which are initially in the form of a friable mass containing a substantial amount of occluded air may be compressed with rapid and effective venting of the occluded air to form the rudimentary candle body. Thereafter and by a second step the rudimentary candle body is subjected to a second molding operation wherein the desired shape is imparted and a smooth peripheral surface having desired contours is imparted.

Further features of this invention relate to the apparatus whereby a candle body is formed by a two-step molding operation. Further features of this invention relate to the means employed for disposing a wick in desired position with reference to a mold and with reference to the supply of finely-divided particulate waxy material compressed within the mold and about the wick.

Further objects and features of this invention will be apparent in connection with the following description of one type of apparatus embodying this invention and adapted for use in typical practice thereof in connection with the accompanying drawings, wherein:

Fig. 2 is a side elevation of the apparatus shown in Fig. 1 with certain of the parts shown in section;

Fig. 3 is a section taken on the line 3—3 of Fig. 2;

Fig. 4 is a section taken on the line 4—4 of Fig. 2;

Fig. 5 is a section taken on the line 5—5 of Fig. 2;

Fig. 6 is an enlarged detail sectional view showing the end of the mold for forming the rudimentary candle body, the closing shutters being shown in closed position; and Fig. 7 is an end view of the parts shown in Fig. 6 when looking to the left.

Figure 1:
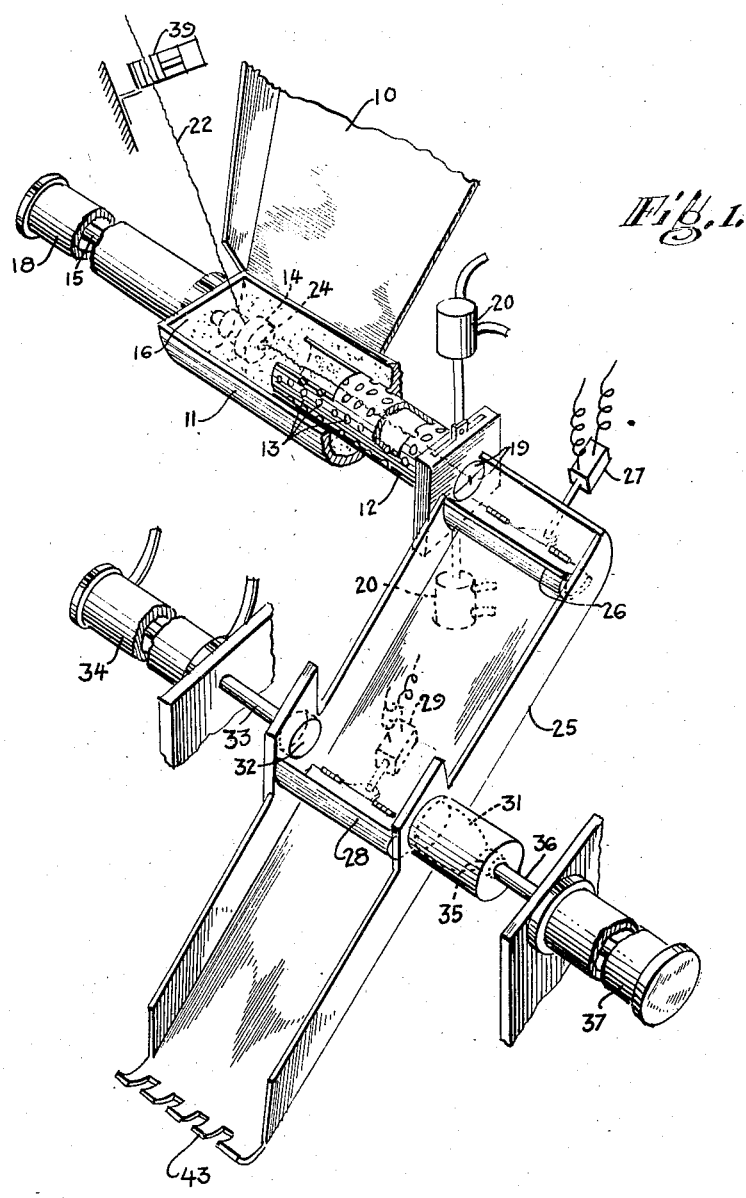
Fig. 1 is a perspective view of apparatus embodying and adapted to be used in the practice of this invention, some of the parts being shown in section and some of the parts being shown schematically.

The apparatus shown in the drawings is adapted to utilize waxy material which is supplied in finely-divided particulate form and which preferably is prepared as disclosed in my copending application Ser. No. 430,900 filed May 19, 1954, for candle and method and apparatus for the manufacture thereof. Thus, the wax which is used may be that which is commonly used in the manufacture of devotional candles, namely, that wax which is commonly called crude white scale wax. This wax is a crude mineral wax of the paraffinic type which usually has a softening point of about 118° to 135° F., e.g., about 125° F. The melting point referred to is that determined by the standard ASTM test No. D87–42. The wax particles are desirably such that their maximum dimension is of the order of .001 to .02". In addition to crude white scale wax, other waxes may be used such as waxes having a melting point between about 105° and about 240° F. Moreover, other waxy materials may be used as disclosed in my aforesaid application Ser. No. 430,900.

Referring more particularly to the embodiment of this invention shown by way of example in the accompanying drawings, finely-divided wax particles are supplied from a suitable source (not shown) so as to be charged by the feeding chute 10 into the trough 11. Within the trough 11 there is disposed the foraminous mold which consists of the cylindrical shell 12 having holes 13 therein which are distributed substantially uniformly throughout the shell 12 in proximate spaced relation.

Particles of waxy material are compressed within the shell 12 by a ram which comprises the molding head 14 adapted to be inserted within the shell 12 and advanced therein for compression of the particles of waxy material within the mold. The head 14 is mounted for reciprocation at the end of the piston rod 15 which passes through the end 16 of the trough 11. By means of a piston 17 within the hydraulic cylinder 18 the piston rod and the head 14 may be reciprocated in either direction responsive to the overall control means for the apparatus so as to synchronize the movement of the head 14 in relation to the other parts of the apparatus.

At the other end of the shell 12 of the foraminous mold there are closing shutters 19 movably mounted in the plate 44 which are adapted to be moved from the closed position shown in Figs. 6 and 7 to open position which permits discharge of a formed rudimentary candle body from the shell 12. The movement of the shutters 19 between closed and open position may be effected in any suitable way as, for example, by the use of the hydraulic cylinders 20. When the shutters 19 are in closed position small notches in the edges of the shutters provide a small opening 40 substantially at the axis of the shell 13, this opening being of such size as to grip and hold the wick 22 that is to be disposed within the candle body to be formed. Preferably the opening 40 is provided at the base of the inclined surfaces 40a. Immediately adjacent the outer surface of the shutters 19 there is disposed the knife 21 which is adapted to be moved clear of the end of the shell 12 when the shutters 19 are opened and which is normally urged inwardly by a spring or the like which is adapted to be tripped when the shutters 19 have again been brought to closed position. Upon tripping the action of the knife 21 it moves inwardly so as to cut the wick 22 immediately adjacent the shutters 19. Any suitable known type of mechanism such as a solenoid 41 may be used for retracting the knife 21 and tripping it so as to cut the wick 22 at the desired time.

The wick 22 is fed into the apparatus from the reel 23 and is fed from the reel 23 through an aperture 24 in the head 14, the aperture 24 on the compacting side of the head 14 being disposed substantially coaxially with respect to the axis of the shell 12.

The upper end of the inclined ramp 25 is disposed so as to receive a rudimentary candle body from the shell 12 upon being ejected therefrom. Moreover, the rudimentary candle body is adapted to roll down the ramp 25 when the wick has been severed by the knife 21. However, a stop 26 is provided so as to initially hold a rudimentary candle body in substantially the position which it occupies after having been initially ejected from the shell 12. This stop is actuated by the solenoid 27 and preferably the stop 26 is adapted to coact with the holding part 42 so as to grip a rudimentary candle body which has been ejected from the shell 12 and hold it stationary until such time as the head 14 has been retracted and the wick has been severed. The solenoid 27 at the proper time is adapted to lower the holding part 26 so as to permit a candle body to roll by gravity from position A (shown in Fig. 5) to position B (shown in Fig. 5) at which the candle body is held from continued movement down the ramp 25 by the stop member 28 which is actuated by the solenoid 29. As will be described hereinbelow, the rudimentary candle body is taken from position B and brought to final form by a second pressure molding operation, after which it is returned to position B (shown in Fig. 5), whereupon the stop member 28 is adapted to be lowered by the action of the solenoid 29 so as to permit the candle body to roll on down the ramp 25 to a suitable collecting means for collecting the finished candles produced by the apparatus such as the holder 43 from which the finished candle can be removed either manually or mechanically.

The finishing mold 30 is disposed substantially coaxially with the position of a candle body when disposed in position B (shown in Fig. 5). The finishing mold 30 is imperforate and the inner surface may have a tapered contour 31. A ram comprising the molding head 32 is mounted for reciprocation at the end of the rod 33 which is adapted to be actuated in either direction as by the use of a hydraulic cylinder 34. Upon outward movement of the molding head 32 a rudimentary candle body may be moved from position B (shown in Fig. 5) so as to be forced into the finishing mold 30 where the final shape and contours of the candle body are imparted as well as the desired surface finish.

At the closed end of the finishing mold 30 there is a third ram comprising the head 35 which is carried by the piston rod 36 for reciprocation imparted by the hydraulic cylinder 37. After the molding step has been accomplished in the finishing mold 30 the head 35 may be advanced so as to return the finished candle body to the position B (shown in Fig. 5).

In typical practice of this invention utilizing the embodiment of this invention shown in the accompanying drawings, the particles of finely-divided waxy material are charged in a friable condition containing a considerable amount of occluded air from the chute 10 into the trough 11 while the head 14 is retracted so as to fill the portion of the shell 12, which is cut away as indicated at 38. The wick 22 has previously been disposed so as to extend from the reel 23 through the aperture 24 in the head 14 and thence to the opening 40 at the juncture between the shutters 19, and the wick 22 as so held is centrally disposed with respect to the shell 12 and is maintained in this position during the feeding of the finely-divided wax particles.

After the charge of finely-divided wax has been supplied from the chute 10 the head 14 is advanced so as to carry wax particles into the cylindrical portion of the shell 12. The head 14 tends to move a column of the wax particles into the shell 12 and the length of the travel of the head 14 prior to its entry into the cylindrical piston of the shell 12 serves to provide a volumetric measure for measuring the quantity of wax particles that are formed into a rudimentary candle by movement of the head 14 to an intermediate position when the desired amount of compaction is attained. Because of the number and distribution of the holes 13 in the shell 12, the occluded air is quickly and effectively vented from the mass so as to permit compaction of the mass and explusion of substantially all of the occluded air. During the advancement of the head 14 the wick is held by the clamp 39 and by thus gripping the wick 22 in the clamp that is disposed between the head 14 and the reel 23 the wick is held so as to become very accurately located within the rudimentary candle body which is produced by compaction of the wax particles when the head 14 is advanced relative to the wick 22. Moreover, even though the shell 12 comprises the holes 13 that are disposed substantially throughout the shell and in proximate spaced relation, only a small quantity of the wax particles is squeezed out of the shell 12 while the occluded air is rapidly and effectively removed.

After the rudimentary candle body has been formed by compaction in the manner above described, the shutters 19 at the remote end of the shell 12 are opened. Thereupon the rudimentary candle body is ejected onto the ramp 25 by movement of the head 14 from intermediate position to fully advanced position, and immediately after it has been fully ejected it is gripped between the stop 26 and the holding member 27 and is so held while the head 14 is being fully retracted to the position shown in Fig. 1.

When the rudimentary candle body is ejected from the shell 12 the clamp 39 is released and the wick 22 is fed from the reel 23 so that a new length of wick is caused to become centrally disposed within the shell 12 and when the head 14 has been retracted again beyond the shutters 19 these shutters close and grip the wick 22 in central opening 40. At substantially the same time the wick is clamped by the clamp 39 so that the new length of wick is firmly held substantially centrally within the shell 12 and the operations hereinabove described may be repeated. As aforesaid, when the shutters 19 close, the mechanism for advancing the knife 21 is actuated so as to sever the wick. By control of the length of stroke of the head 14 a desired length of wick may be left protruding from the rudimentary candle body.

While the head 14 is completing its retraction stroke after the shutters 19 have started to close the stop 26 is lowered so as to permit the candle body to roll down the ramp 25 and it is stopped by the stop 28 in position B (shown in Fig. 5). When the candle body is in this position it is adapted to be pushed forwardly by the head 32 so as to be subjected to compression within the finishing mold 30. As aforesaid, the compression within the mold 30 provides the desired final shape and contours and also provides the desired surface finish. During this operation the head 14 may be advanced for forming a next succeeding rudimentary candle body in the shell 12 in the manner that has been described hereinabove.

After the finished candle has been formed in the finishing mold 30 the head 32 is retracted and at the same time the head 35 is advanced so as to place the finished candle in position on the ramp 25 where it again is held by the stop 28.

After the finished candle has been moved out onto the ramp 25 the stop 28 is lowered so as to permit the finished candle to continue down the ramp 25 for removal from the apparatus.

By utilizing the apparatus of this invention, occluded air may be quickly and effectively vented from a friable mass of particles of waxy material used for molding a candle body. This is of particular advantage in connection with molding of candle bodies of substantial size such as a one-pound devotional candle. By forming a candle body in a foraminous mold which freely permits surface venting, occluded air may be effectively expelled in only about a quarter of the time that would be required if attempt were made to perform the molding operation in a single mold for the purpose of producing the finished candle. Thus in molding a one-pound devotional candle a rudimentary candle body can be readily produced in about 15 seconds' molding time. Notwithstanding the shortness of the time interval, substantially all of the occluded air may be expelled.

During the second molding step there is no problem of venting because substantially all of the occluded air has already been vented and this step may be carried out as rapidly as the first step. The result is that by carrying out the molding in two steps as described and exemplified hereinabove the molding of candles may be completed much more rapidly than when using a single molding operation. Moreover, since the second step does not involve venting, its function is essentially that of shaping and providing the surface finish and it is possible to eliminate any surface roughness caused by occluded bubbles more effectively than is possible when a single molding step is utilized, with the result that surface imperfections may be eliminated virtually completely.

After the candle has been formed the particles of wax or other waxy material continue to gradually coalesce with resultant increase in the homogenousness of the candle body and it may be noted that in ordinary practice the second molding operation is carried out while the coalescence of the wax particles is only partial and that the final coalescence of the particles occurs in the finished candle.

The molding pressure employed may be of the same order as that described in my aforesaid application Ser. No. 430,900. A molding pressure of about 45 lbs. per sq. in. in each of the steps is suitable. To obtain a desired compaction it is normally desirable that the molding pressure in each of the steps be at least 40 lbs. per sq. in. while molding pressures above about 100 lbs. per sq. in. normally are not employed because if only a minute amount of occluded air is retained the tendency thereof to re-expand may cause minor imperfections in the body of the compacted waxy material upon removal of the applied pressure. During the compaction for producing the rudimentary candle body the rate of compaction preferably is not greater than about one inch per second so as to allow time for effecting uniform consolidation and venting of occluded air.

It is to be noted that in the practice of this invention the wick is firmly positioned before the finely divided particulate waxy material is disposed about the wick, with the result that the wick is initially positioned with accuracy at the axis or other predetermined location within the candle body. Moreover, by causing the wick to be clamped during the movement of the compressing head 14 not only between the shutters 19 but also by the clamp 39 the wick continues to be firmly held so that, notwithstanding the movement of the head 14 and the wax particles compressed thereby relative to the wick, the wick is held firmly in position until the rudimentary candle body has been completely formed by compaction of the particles of waxy material.

In the drawings the molds in which the candle body is formed are adapted to produce a cylindrical candle body. However, the peripheral contour may be elliptical in cross section or of other shape and it is to be understood that the term "tubular mold" as used herein and in the claims refers to molds of different cross sectional shapes within which a ram or the like is adapted to be reciprocated for compacting therein particles of waxy material into a candle body.

It is to be noted that when the continuous wick is severed by the knife 21, the severance occurs in substantially spaced relation to the surface of the shutters that provides the inner end surface of the mold in which the rudimentary candle body is formed, with the result that when the rudimentary candle body is formed there is a short length of wick that protrudes therefrom. This may be and usually is used for attaching thereto a wick base so a self-supporting wick will be held in upright position even though the wax may become liquid as the result of melting in the container in which devotional candles are usually burned. The wick base can be attached after the finished candle has been formed, but if desired it could also be attached by suitable mechanism or even manually after the rudimentary candle body has been formed and prior to the second pressure molding step.

While this invention has been described in connection with a specific embodiment thereof, it is to be understood that this has been done for purposes of illustration and that other embodiments may be employed for putting into practice the principle of operation and constructional utility that have been described and illustrated hereinabove.

I claim:

1. Apparatus for making a candle which comprises a first tubular mold, said mold having a feed end and a discharge end and having vent holes in the wall thereof, a first ram longitudinally reciprocatable in said mold, means comprising a rod extending from the feed end of said mold for reciprocating said ram, removable closure means at the other end of said mold, means for continuously supplying a wick, said ram having an aperture therein for passage of said wick therethrough and permitting longitudinal movement of said ram relative to said wick, said closure means having an aperture therein adapted to grip said wick when said closure means is in closed position, means comprising said closure means for holding said wick disposed longitudinally of said mold, means for charging a friable mass of finely-divided particles of waxy material into said mold and about said wick when said ram is retracted for being compressed by said ram upon advancement thereof while said closure is in closed position to thereby form a rudimentary candle body, means for opening said closure means and for further advancing said ram to eject the rudimentary candle body from the discharge end of the mold and draw the wick therewith, means for closing said closure means after said ram has been retracted, means adjacent said closure means for severing the wick after said closure means has become closed, a second tubular mold, said second tubular mold being adapted to receive a rudimentary candle body formed in said first mold, a second ram reciprocatable in said second mold, means for reciprocating said second ram, means for disposing a rudimentary candle body discharged from said first mold in position for said second ram to compress the rudimentary candle body within the second mold, a third ram reciprocatable in said second mold, and means comprising a rod extending from the other end of said second mold for reciprocating said third ram in said second mold to eject therefrom a candle formed therein upon advancement of said third ram.

2. Apparatus for making a candle according to claim 1 wherein said first and second molds are disposed substantially horizontally with the receiving end of said second mold in opposed offset relation with respect to the discharge end of said first mold and wherein said means for disposing a rudimentary candle body discharged from said first mold in position to be compressed in said second mold comprises a ramp inclined for effecting gravitational movement of the rudimentary candle body from position in alignment with said first mold to position in alignment with said second mold, and removable stop means for successively holding the rudimentary candle body in substantial alignment with said first mold and with said second mold.

3. Apparatus for making a candle body comprising a first substantially horizontal tubular mold, a second substantially horizontal tubular mold disposed in substantially offset, lower, parallel relation with respect to said first mold with the receiving end thereof substantially spaced from the discharge end of said first mold, an inclined ramp disposed for receiving a rudimentary candle body discharged from said first mold and for movement of said candle body to position substantially aligned with said second tubular mold adjacent said receiving end thereof, means for moving said candle body from said ramp into said second mold and for compressing it therein, means for returning the candle body from said second tubular mold to said ramp, and removable stop means for holding a candle body on said ramp in substantial alignment with said first tubular mold and with said second tubular mold.

4. Apparatus for making a candle body which comprises a first mold having peripheral vent openings therein, a second substantially imperforate mold, means for compressing finely-divided particles of waxy material in said first mold to form a rudimentary candle body, said second mold being adapted to receive a rudimentary candle body formed in said first mold, means for compressing said rudimentary candle body in said second mold to desired peripheral dimensions, and means for transferring a rudimentary candle body formed in said first mold from said first mold into said second mold.

5. Apparatus for making a candle body which comprises a first mold, the side wall of which comprises holes distributed substantially throughout in proximate spaced relation, means for introducing finely-divided particles of waxy material into said first mold, means for compressing said particles in said mold with venting of occluded air therefrom through said holes, a second mold, means for transferring a rudimentary candle body formed in said first mold from said first mold into said second mold, means for subjecting a rudimentary candle body to compression in said second mold, and means for ejecting from said second mold a candle body formed therein, said second mold having a substantially imperforate wall for imparting a smooth surface to the candle body.

6. Apparatus for making a candle which comprises a first tubular mold, means for holding a wick centrally disposed in said mold, means for filling said mold with finely-divided particles of waxy material disposed about said wick, ram means movable longitudinally of said mold relative to said wick for compressing said particles of waxy material in said mold about said wick, wick supply means for supplying continuous wick, means comprising said ram for ejecting a rudimentary candle body formed in said first tubular mold from said mold with advancement of said wick therewith from said wick supply means, means for severing said wick from the ejected rudimentary candle body, a second tubular mold adapted to receive through one end thereof a rudimentary candle body formed in said first tubular mold, means for introducing a rudimentary candle body ejected from said first tubular mold into said second tubular mold through said receiving end thereof, means for compressing said rudimentary candle body in said second tubular mold, and means for ejecting a candle body formed in said second tubular mold from said second tubular mold through said receiving end thereof.

7. Apparatus for making a candle body having predetermined peripheral contours comprising a first mold, means for holding a wick centrally disposed within said mold, means for charging finely-divided particles of waxy material into said mold disposed about said wick, means for compressing said particles longitudinally relative to said wick to form a rudimentary candle body having said wick embedded therein, means for ejecting said rudimentary candle body with said wick embedded therein from said first mold, means for severing the wick in adjacent spaced relation to the candle body, a second mold, means for placing said rudimentary candle body in said second mold, and means for compressing said rudimentary candle body in said second mold to impart said predetermined peripheral contours.

8. Apparatus for making a candle body which comprises a tubular mold, a pair of shutters at one end thereof, means for retracting said shutters to permit a candle body to be ejected from said mold and to bring said shutters together to close said end of said mold, said shutters when closed having an opening which is centrally disposed with respect to said mold and which is formed by abutting surfaces of said shutters so as to hold a wick gripped therein, a ram reciprocatable in said mold and having a passage therethrough for passage of a wick therethrough in slidable relation relative to said ram, means for reciprocating said ram between retracted position removed from said mold, an intermediate position, and a fully advanced position, means for disposing finely-divided particles of waxy material when said ram is in retracted position for being compressed in said mold upon advancing said ram from said retracted position to said intermediate position, a wick reel disposed for passage of a wick from said reel through said passage in said ram and thence to said opening, a fixed clamp for clamping said wick that is disposed between said reel and said ram, and means for actuating said clamp to grip said wick during movement of said ram between said retracted position and said intermediate position and for releasing said wick during movement of said ram from said intermediate position to said fully advanced position.

9. Apparatus for making a candle body which comprises a tubular mold, a ram reciprocable within said mold and having an aperture therein, means comprising a rod adapted to extend into one end of said mold for reciprocating said ram, a reel adapted to feed a continuous wick through said aperture in said ram into said mold, holding means adapted to hold said wick adjacent the other end of said mold, a clamp which is adapted to clamp said wick for holding said wick and which is disposed between said reel and said ram, means for charging finely-divided particles of waxy material into said mold to be compressed by said ram and means for operating said clamp for alternately gripping said wick during compression of the finely-divided particles of waxy material in said mold and releasing said wick to permit advancement of the wick during ejection of the molded body from the mold.

10. Apparatus for making candles which comprises a tubular mold for a candle body, removable closure means for one end of said mold, a ram mounted for being inserted into the other end of said mold to compact wax particles therein and to be retracted from said end of said mold, said ram having an aperture therein for passage of a wick therethrough into said mold and for permitting movement of said ram relative to said wick, wick supply means for supplying wick through said aperture into said mold, wick-holding means carried by said removable closure means adapted to hold a wick therein in position substantially centrally of said mold when said closure is in position to close said mold and to be separated from said wick when said wick is in said position, means for introducing a friable mass of wax particles into said mold when said ram is retracted from said mold and while said wick is supported substantially centrally of said mold by said holding means and said aperture in said ram, and releasable wick-clamping means disposed between said wick supply means and said ram adapted to grip and hold said wick while said wax particles are being compacted within said mold by said ram during advancement of said ram from said retracted position.

References Cited in the file of this patent

UNITED STATES PATENTS

| | | |
|---|---|---|
| 630,397 | Niedringhaus | Aug. 8, 1899 |
| 1,822,172 | Pfleumer et al. | Sept. 8, 1931 |
| 2,360,275 | Rau | Oct. 10, 1944 |
| 2,679,069 | Keogh | May 25, 1954 |